(12) United States Patent
Florencio

(10) Patent No.: US 6,775,325 B1
(45) Date of Patent: Aug. 10, 2004

(54) METHOD AND APPARATUS FOR CONVERTING THE BITRATE OF AN ENCODED BITSTREAM WITHOUT FULL RE-ENCODING

(75) Inventor: Dinei A. Florencio, Redmond, WA (US)

(73) Assignee: Sarnoff Corporation, Princeton, NJ (US)

( * ) Notice: Subject to any disclaimer, the term of this patent is extended or adjusted under 35 U.S.C. 154(b) by 693 days.

(21) Appl. No.: 09/286,760

(22) Filed: Apr. 6, 1999

Related U.S. Application Data
(60) Provisional application No. 60/103,349, filed on Oct. 7, 1998.

(51) Int. Cl.[7] .................................................. H04N 7/12
(52) U.S. Cl. .................................................. 375/240.03
(58) Field of Search .............................. 348/419, 384, 348/405, 420; 358/261.3; 375/240, 240.03

(56) References Cited

U.S. PATENT DOCUMENTS

| | | | | |
|---|---|---|---|---|
| 5,299,019 A | * | 3/1994 | Pack et al. ............... | 358/261.3 |
| 5,333,012 A | * | 7/1994 | Singhal et al. ............ | 348/405 |
| 5,486,863 A | * | 1/1996 | Auyeung et al. .......... | 348/420 |
| 5,754,235 A | * | 5/1998 | Urano et al. .............. | 348/405 |

FOREIGN PATENT DOCUMENTS

| | | |
|---|---|---|
| EP | 0 719 055 A2 | 6/1996 |
| WO | WO 95/29561 | 11/1995 |
| WO | WO 97/39584 | 10/1997 |
| WO | WO 98/32285 | 7/1998 |

* cited by examiner

*Primary Examiner*—Chris Kelley
*Assistant Examiner*—Allen Wong
(74) *Attorney, Agent, or Firm*—William J. Burke, Esq.

(57) ABSTRACT

An apparatus and method for changing the bitrate of an encoded bitstream in a compressed domain, i.e., a domain where the input image is still represented by transform coefficients, e.g., DCT coefficients or wavelet coefficients is disclosed. The bitrate of the encoded bitstream is changed by applying a different quantization scale directly to the transform coefficients of the encoded bitstream. The requantization error or distortion introduced by the requantization process is addressed by propagating the requantization error to the following frame.

21 Claims, 8 Drawing Sheets

METHOD AND APPARATUS FOR CONVERTING THE BITRATE OF AN ENCODED BITSTREAM WITHOUT FULL RE-ENCODING

This application claims the benefit of U.S. Provisional Application No. 60/103,349 filed Oct. 7, 1998, which is herein incorporated by reference.

The invention relates generally to the field of digital multimedia communications. More specifically, the invention relates to a method and apparatus for converting the bitrate of an encoded bitstream without having to execute a full-re-encoding process, i.e., without having to first decode the encoded bitstream and then re-encode the decoded images at the new desired bitrate.

BACKGROUND OF THE DISCLOSURE

The increasing demand for digital video/audio information presents an ever increasing problem of transmitting and/or storing an enormous amount of information. For example, the growth of the Internet and the demand for digital studio or server (e.g., to provide video-on-demand services of stored programmings) have enabled many users to gain access to various multimedia information such as video clips or movies. Since multimedia information is often very large in term of size, the multimedia information is typically stored in an encoded form, e.g., an encoded bitstream. The encoded bitstream is encoded to minimize spatial and temporal redundancy, thereby minimizing transmission and storage requirements. However, the bitstream is often encoded at a particular bitrate without knowledge as to the processing resources that will be made available to retrieve or access the encoded bitstream.

The encoded bitstream, e.g., MPEG signals, can be encoded at different bitrates in order to accommodate different requirements of different applications. For example, digital studio material is likely to be stored at a higher bitrate to maintain a high level of quality in the stored material. However, in certain situations the encoded signal may be desired at a lower bitrate, e.g., for reducing the cost of storage or for fitting the capacity of a specific transmission media.

For example, two methods of accessing an image sequence across a network or communication channel are available. First, the user can download the compressed bitstream in its entirety, and then decode and display the image sequence locally using the user's computer. One drawback of this method is the length of time that a user must wait while the image sequence is being downloaded. Another drawback is that the user may need to reserve a large storage space to accommodate a large image sequence.

A second method is referred to as "video streaming" where the processes of downloading, decoding and displaying the image sequence can be performed simultaneously. Namely, each frame of a sequence is immediately decoded and displayed upon receipt by the user.

However, video streaming poses a new set of challenges. Generally, the pre-recorded original video sequence is compressed at a certain bit-rate. This bitrate may not coincide with the channel bitrate used by the user. Namely, users may download the image sequence at a different bit rate, depending on the available bandwidth, e.g., high user access time versus low user access time. Although the server can reduce the delivery rate of the image sequence to match the channel bit rate, such reduction will result in a "slow motion" display at the receiver.

One solution to address varying bitrate is to decode the image sequence at the server, and then re-encode the image sequence using different coding parameters, e.g., different quantizer scales, thereby resulting in a desired bit-rate. Although this method has proven to be effective, it is computationally expensive. Namely, for a single frame, requantizing the image with a different quantizer scale is reasonably straightforward.

To avoid such computational expense, one can partially decode the image sequence and then apply requantization. However, if the requantized frame is used as a reference frame (as most I and P frames are) the additional quantization error will propagate to other frames. This error is often referred to as "drifting", and creates a distortion in addition to that caused by the reduced bitrate, and may be unacceptable in some application.

Therefore, a need exists in the art for an apparatus and method for changing the bitrate of an encoded bitstream while minimizing drifting and computational cost.

SUMMARY OF THE INVENTION

The present invention provides an apparatus and method for changing the bitrate of an encoded bitstream in a compressed domain, i.e., a domain where the input image is still represented by transform coefficients, e.g., DCT coefficients or wavelet coefficients. The bitrate of the encoded bitstream is changed by applying a different quantization scale directly to the transform coefficients of the encoded bitstream. The requantization error or distortion introduced by the requantization process is addressed by propagating the requantization error to the following frame.

More specifically, the drifting distortion after requantization for each of the reference frames, e.g., I or P frames, are stored in a "distortion reference frame", which is used to propagate the requantization error. Namely, the errors in the "distortion reference frame" are used to derive "distortion adjustments" for frames that depend from such reference frames, e.g., subsequent B and P frames. The distortion adjustments are in the form of transform coefficient values that are then added to relevant blocks of subsequent B and other P frames. Since the distortion adjustments are added to subsequent B and P frames prior to the requantization of these subsequent B and P frames, "drifting" is accounted for in the compressed domain without having to completely decode the entire image sequence and then re-encode the entire image sequence using a new quantization scale. This novel method of changing the bitrate of an encoded bitstream addresses "drifting", while significantly reduces the computational cost in implementing bitrate changes.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
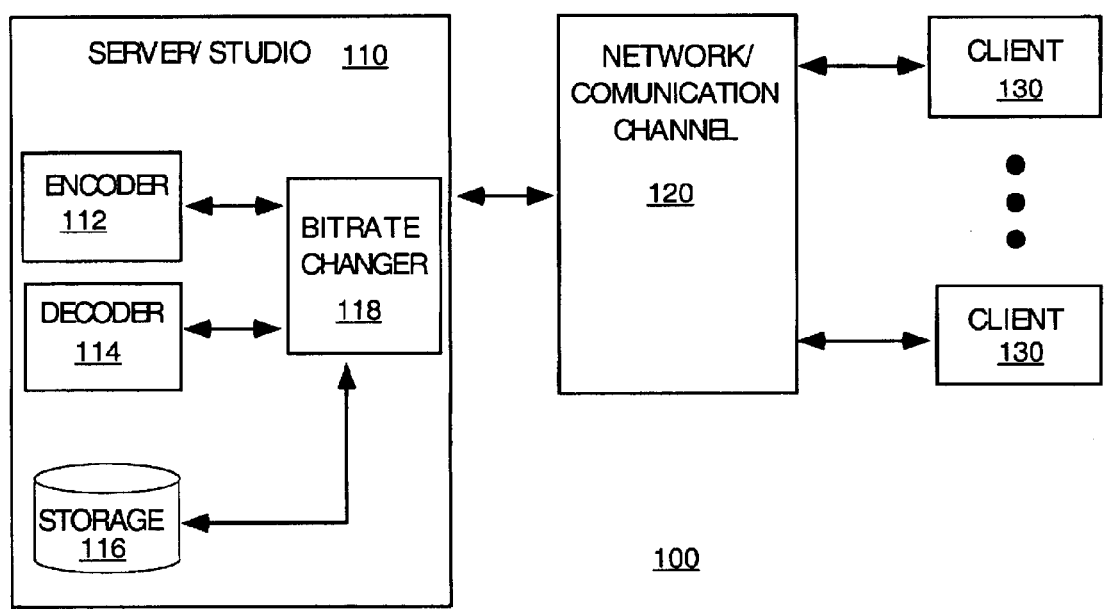
FIG. 1 illustrates a block diagram of a network environment having a server incorporating a bitrate changer of the present invention.

FIG. 1 illustrates a block diagram of a network environment having a server or digital studio 110 incorporating the bitrate changer 118 of the present invention. More specifically, a plurality of clients or users 130 are able to access various image sequences stored on the server 130 via a communication channel or computer network 120.

As discussed above, if the bitrate of the pre-recorded image sequence is to be changed to a different bitrate, e.g., to match the bitrate of the communication channel used by the client, then the server can adjust the bitrate of the pre-recorded image sequence by decoding and re-encoding the image sequence in the bitrate of the communication channel used by the client. Unfortunately, since such real-time decoding/re-encoding operation is computationally expensive, the server will likely be equipped with expensive special purpose hardware.

More specifically, the computational cost is attributed to the extremely time-consuming process of estimating motion as employed in encoding standards such as MPEG and H.263 which employ motion estimation techniques. Some implementations may employ full motion search algorithms which generate very accurate motion information, but at the expense of incurring a very high cost in computational cycles. As such, these implementations are not practical when it is performed in real-time using software, thereby requiring the use of faster special purpose hardware. In addition, with these encoding standards, the server cannot arbitrarily drop frames in the compressed domain due to inter frame encoding. Thus, if the server is to re-encode the image sequence at a different bitrate, the server will have to recompute the motion information, e.g., motion vectors at the new bitrate.

The present invention discloses a novel bitrate changer 118. Namely, FIG. 1 illustrates a server 110 having an encoder 112, a decoder 114 and a storage 116. The encoder 112 is an encoder capable of performing motion estimation and retrieving motion information. As such, the encoder 112 can be implemented as an MPEG compliant encoder. Although the present invention is described below with reference to an MPEG compliant encoder, those skilled in the art will realize that the present invention can be adapted to other encoders that employ motion estimation technique, e.g., an H.263 compliant encoder and the like.

In operation, one or more image sequences are pre-encoded and stored in storage 116 at a particular bitrate. If a client 130 requests an image sequence from the server 110 that matches the desired bitrate of the pre-recorded image sequence, then the server will simply forward the image sequence directly to the client via the network without further processing.

If the client requests an image sequence at a different bitrate from the bitrate in which the image sequence was encoded, then the server 110 must change the bitrate of the encoded bitstream using bitrate changer 118. In brief, the bitrate changer 118 changes the bitrate of an encoded bitstream in a compressed domain, i.e., a domain where the input image is still represented by transform coefficients, e.g., DCT coefficients or wavelet coefficients. The bitrate of the encoded bitstream is changed by applying a different quantization scale directly to the transform coefficients of the encoded bitstream. The requantization error or distortion introduced by the requantization process is addressed by propagating the requantization error to the following frame.

Figure 2:
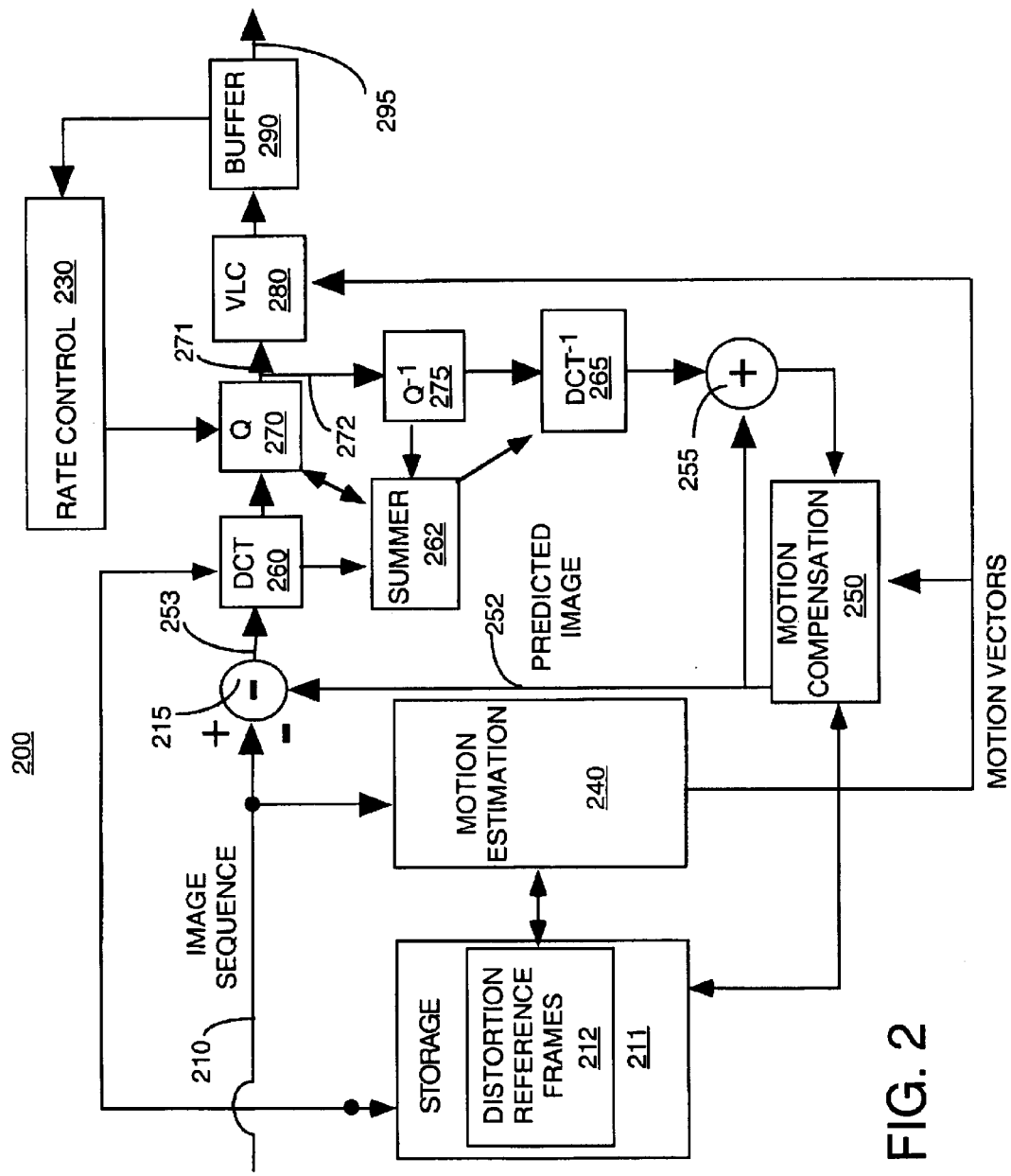
FIG. 2 illustrates a block diagram of an encoder incorporating the bitrate changing method of the present invention.

FIG. 2 illustrates a block diagram of an exemplary encoder 200 incorporating the bitrate changing method of the present invention directly into the encoder. Namely, the functions that are performed by the bitrate changer 118 are also typically performed or available in an MPEG compliant encoder. Thus, although FIG. 1 illustrates the bitrate changer as a stand alone module, one can adapt an existing encoder with the present bitrate changing method.

Figure 3:
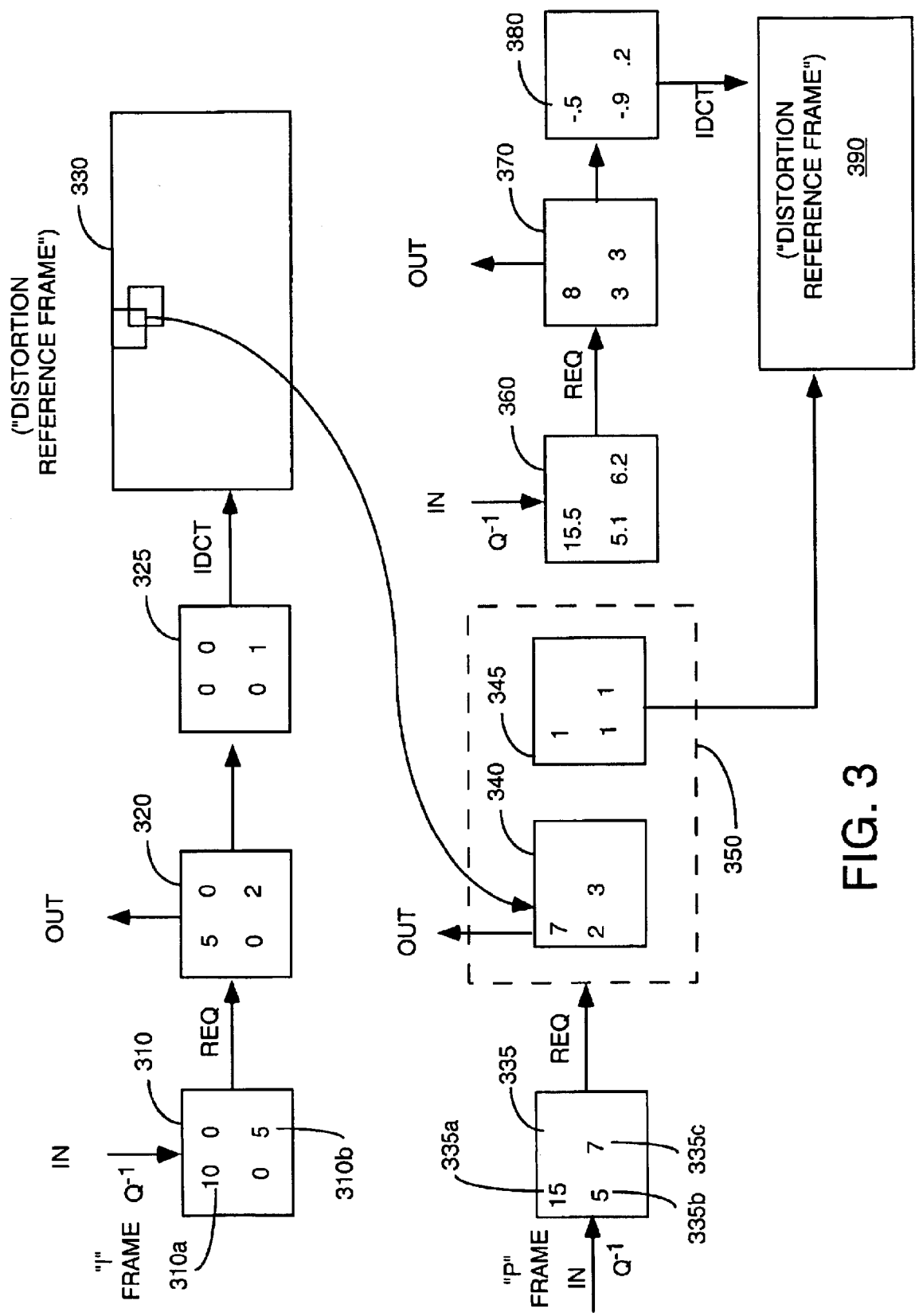
FIG. 3 illustrates a block diagram of the effect of the present bitrate changing method on a block of transform coefficients of a reference frame and its subsequent effect on other frames that use the reference frame.

FIG. 3 illustrates a block diagram of the effect of the present bitrate changing method on a block of transform coefficients of a reference frame and its subsequent effect on other frames that use the reference frame. It should be noted that the present bitrate changing invention is now described in conjunction with the basic operation of the encoder. To best understand the invention, the reader should simultaneously consult both FIGS. 2 and 3 while reading the following description of the invention.

The encoder 200 comprises a motion estimation module 240, a motion compensation module 250, a rate control module 230, a transform module 260 (e.g., DCT transform or wavelet transform), a quantization (Q) module 270, a variable length coding (VLC) module 280, a buffer 290, an inverse quantization ($Q^{-1}$) module 275, an inverse DCT ($DCT^{-1}$) transform module 265, a subtractor 215, summers 255 and 262, and a storage 211 for storing distortion reference frames 212. Although the encoder comprises a plurality of modules, those skilled in the art will realize that the functions performed by the various modules are not required to be isolated into separate modules as shown in FIG. 2. For example, the set of modules comprising the motion compensation module 250, inverse quantization module 275 and inverse DCT module 265 is generally known as an "embedded decoder".

FIG. 2 illustrates an input video image (image sequence) on signal path 210 which is digitized and represented as a luminance and two color difference signals (Y, $C_r$, $C_b$) in accordance with the MPEG standards. The input video image on path 210 is received into motion estimation module 240 for estimating motion vectors. The motion vectors from the motion estimation module 240 are received by the motion compensation module 250 for improving the efficiency of the prediction of sample values. Motion compensation involves a prediction that uses motion vectors to provide offsets into the past and/or future reference frames containing previously decoded sample values that are used to form the prediction error.

Once a coding mode is selected, motion compensation module 250 generates a motion compensated prediction (predicted image) on path 252 of the contents of the block based on past and/or future reference pictures. This motion compensated prediction on path 252 is subtracted via subtractor 215 from the video image on path 210 in the current macroblock to form an error signal or predictive residual signal on path 253. It should be noted that if a current frame is encoded as an "I" frame, then the signal on path 253 is simply the original picture and not a predictive residual signal.

The transform module 260 then applies a transform, e.g., forward discrete cosine transform (DCT) process to each block of the predictive residual signal to produce a set of eight (8) by eight (8) block of DCT coefficients. The DCT basis function or subband decomposition permits effective use of psychovisual criteria which is important for the next step of quantization. It should be noted that other transforms can be employed, e.g., wavelet transform.

The resulting 8×8 block of DCT coefficients is received by quantization (Q) module 270 and variable length coding (VLC) module 280 where the DCT coefficients are quantized and coded. Finally, the data stream is received into a "First In-First Out" (FIFO) buffer 290. In applications that involve a fixed-rate channel, a FIFO buffer is used to match the encoder output to the channel for smoothing the bit rate. Thus, the output signal of FIFO buffer 290 on path 295 is a compressed representation of the input video image on path 210.

The rate control module 230 serves to monitor and adjust the bitrate of the data stream entering the FIFO buffer 290 to prevent overflow and underflow on the decoder side (within a receiver or target storage device, not shown) after transmission of the data stream. Furthermore, the bitrate of the image sequence can be adjusted via rate control module 230, e.g., by changing the quantization scale as discussed below.

The resulting 8×8 block of quantized DCT coefficients from the quantization module 270 is also received by the inverse quantization module 275 via signal connection 272. At this stage, the encoder regenerates "I" frames and "P" frames of the input video image by decoding the data so that they are used as reference or anchor frames for subsequent encoding.

The resulting dequantized 8×8 block of DCT coefficients are passed to the inverse DCT module 265 where inverse DCT is applied to each macroblock to produce the decoded error signal. This error signal is added back to the prediction signal from the motion compensation module via summer 255 to produce a decoded reference picture (reconstructed image).

Figure 8:
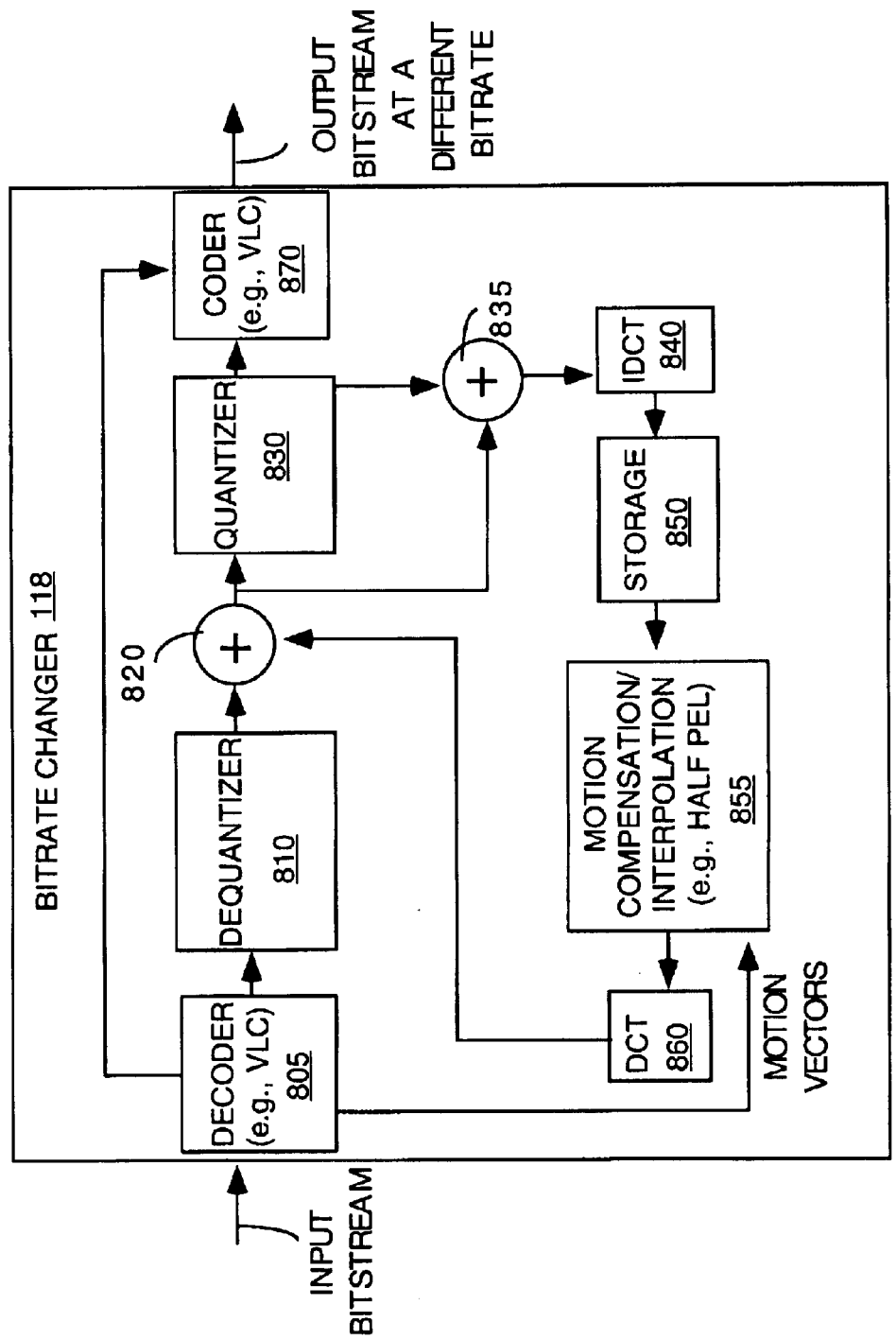
FIG. 8 illustrates a block diagram of a bitrate changer of the present invention.

Although the present invention is described above in terms of a modified encoder, it should be understood that the present bitrate changer 118 can be implemented separately in a more simplified embodiment having only modules that are necessary to provide the bitrate changing function. More specifically, FIG. 8 illustrates a block diagram of a bitrate changer 118 of the present invention having an optional decoder 805, a dequantizer 810, summers 820 and 835, a quantizer 830, an optional coder 870, a transform module, e.g., DCT 860, a motion compensation module 855, a storage 850, e.g., memory, for storing distortion reference frames and an inverse transform module 840, e.g., an IDCT.

These modules perform the same functions as described above in FIG. 2. However, unlike the encoder of FIG. 2, computational complexity such as motion estimation can be omitted from the bitrate changer 118. In fact, the decoder 805 is illustrated as an optional module depending on the format of the input stream. Namely, the decoder 805 is tasked with decoding the input stream to obtain transform coefficients, motion vectors and various other information, e.g., header information. The transform coefficients are forwarded to the dequantizer and the motion vectors are forwarded to the motion compensation module 855. However, if the input stream is in a format where such information is readily available, then the decoder 805 can be omitted.

The same reasoning applies to the optional coder 870 for encoding the newly quantized coefficients. Namely, the newly quantized coefficients can be encoded immediately into a bitstream with a different bitrate or it may undergo additional image processing as necessary for a particular application. Thus, any encoding or decoding functions that are not available in the bitrate changer 118 can be passed to the encoder 112 or decoder 114 for processing.

Referring to FIG. 3, dequantization is applied (e.g., via inverse quantizer or dequantizer 272 or 810) to a block of coefficients from an I frame of the encoded image sequence (encoded bitstream) to obtain a block 310 of dequantized transform coefficients. If the encoded image sequence is in a format such that dequantization is not necessary, then the dequantization step is omitted. It should be noted that the term block can be a block of any size, e.g., a macroblock, a subblock, a single pixel or even a block comprising the entire image frame.

Block 310 illustrates two non-zero coefficients 310a and 310b having values of 10 and 5, respectively. Requantization is then applied (e.g., via quantizer 270 or 830) to block 310 to obtain a block 320 of requantized transform coefficients. If requantization is applied using a quantization scale that is twice as large as the quantization scale that was previously applied, then the two non-zero coefficient values of 10 and 5 are now illustratively shown as 5 and 2. Block 320 is then re-encoded into the bitstream, e.g., via VLC module 280 or 870.

However, FIG. 3 illustrates that the requantization step has introduced a requantization error as applied to the transform coefficient 310b. Namely, distortion block 325 illustrates that the requantization process on transform coefficient 310b is lossy by a coefficient value of "1".

In turn, inverse transform is applied by the inverse transform module (265 or 840) to the distortion block 325 to arrive at a requantization distortion signal represented in the pixel domain which is stored as part of a distortion reference frame 330 in storage 211 or 850. It should be noted that since the I frame is not dependent on other reference frames, requantization of other frames before the current I frame is not relevant and is not accounted for in the re-encoding of the current I frame.

FIG. 3 then illustrates dequantization being applied (e.g., via inverse quantizer or dequantizer 272 or 810) to a block of coefficients from a P frame of the encoded image sequence (encoded bitstream) to obtain a block 335 of dequantized transform coefficients. Again, if the encoded image sequence is in a format such that dequantization is not necessary, then the dequantization step is omitted.

Block 335 illustrates three non-zero coefficients 335a, 335b and 335c having values of 15, 5, and 7, respectively. If no drifting compensation was to be introduced, quantization would then be applied (e.g., via quantizer 270 or 830) to block 335 to obtain a block 340 of requantized transform coefficients. If requantization is applied using a quantization scale that is twice as large as the quantization scale that was previously applied, then the three non-zero coefficient values of 15, 5, and 7 are now illustratively shown as 7, 2 and 3. Block 340 can then be re-encoded into the bitstream, e.g., via VLC module 280 or 870.

FIG. 3 illustrates that the requantization step has again introduced a requantization error as applied to the transform coefficients 335a–c. Namely, distortion block 345 illustrates that the requantization process on transform coefficients 335a–c is lossy by a coefficient value of "1" for all three coefficients. In turn, inverse transform is applied to the distortion block 325 to arrive at a requantization distortion signal represented in the pixel domain which is stored as part of a distortion reference frame 390.

However, unlike an I frame, a P frame is dependent on other reference frames, such that requantization error from such other reference frames before the current P frame is relevant and must be accounted for in the re-encoding of the current P frame. For example, if it is determined that the current block in the P frame is pointing to a block in the reference frame that has introduced quantization error, then the steps represented in the dashed block 350 is not performed. Instead, the quantization error introduced in the same block of the previous reference frame(s) is determined and transformed into adjustment values (distortion adjustment) in the transform domain, e.g., 0.5, 0.1 and −0.8 for transform coefficients 335a–c, respectively and possibly other coefficients.

Thus, as illustrated in block 360, the adjustment values are computed and added to the transform coefficients 335a–c of block 310 prior to performing requantization. The adjustment is obtained by retrieving the pixel domain correction stored in 850 and applying motion compensation and interpolation based on the motion vectors information provided in the bitstream. Before adding the correction to the current frame, the correction is converted back to the DCT domain in transform module 860.

In turn, requantization is then applied to block 360 to arrive at a block 370 of requantized coefficients. If requantization is applied using a quantization scale that is twice as large as the quantization scale that was previously applied, then the three non-zero coefficient values of 15.5, 5.1, and 6.2 are now illustratively shown as 8, 3 and 3. Block 370 can then be re-encoded into the bitstream, e.g., via VLC module 280 or 870.

Finally, the requantization distortion is again represented in block 380. Inverse transform is applied to the distortion block 380 to arrive at a requantization distortion signal represented in the pixel domain which is stored as part of a distortion reference frame 390. This can be accomplished in the pixel domain by computing IDCT of block 380 using module 840 and storing the result in a distortion reference frame 390 located in storage 211 or 850.

It should be noted that the processing of B frames are very similar to the P frames, with the exception that B frames are typically not used as reference frames. In applications where B frames are not used as reference frames, the requantization distortion introduced by requantizing B frames are not stored in distortion reference frames, since such information cannot be exploited to correct requantization error.

In fact, if computational expense or latency is a concern in a particular application, the present invention can be adapted such that distortion adjustment is only implemented for P frames and no distortion adjustment is computed for the B frames. This will reduce computational expense and latency at the expense of introducing some distortion.

Furthermore, it should be noted that the present invention can be applied in various bitrate changing scenarios. Specifically, the input bitstream may be encoded at a constant bitrate that is converted to a different or varying bitrate or the input bitstream may be encoded or received at a varying bitrate that is converted to a constant bitrate.

In sum, the drifting distortion after requantization for each of the reference frames, e.g., I or P frames, are stored in a "distortion reference frame", which is used to propagate the requantization error. The errors in the "distortion reference frame" are used to derive "distortion adjustments" for frames that depend from such reference frames, e.g., subsequent B and P frames. The distortion adjustments are in the form of transform coefficient values that are then added to relevant blocks of subsequent B and other P frames. Since the distortion adjustments are added to subsequent B and P frames prior to the requantization of these subsequent B and P frames, "drifting" is accounted for in the compressed domain without having to completely decode the entire image sequence and then re-encode the entire image sequence using a new quantization scale. This novel method of changing the bitrate of an encoded bitstream addresses "drifting", while significantly reducing the computational cost in implementing bitrate changes. A detailed description as to the changing of the bitrates for I, P and B frames are provided below with respect to FIGS. 4 and 5.

Figure 4:
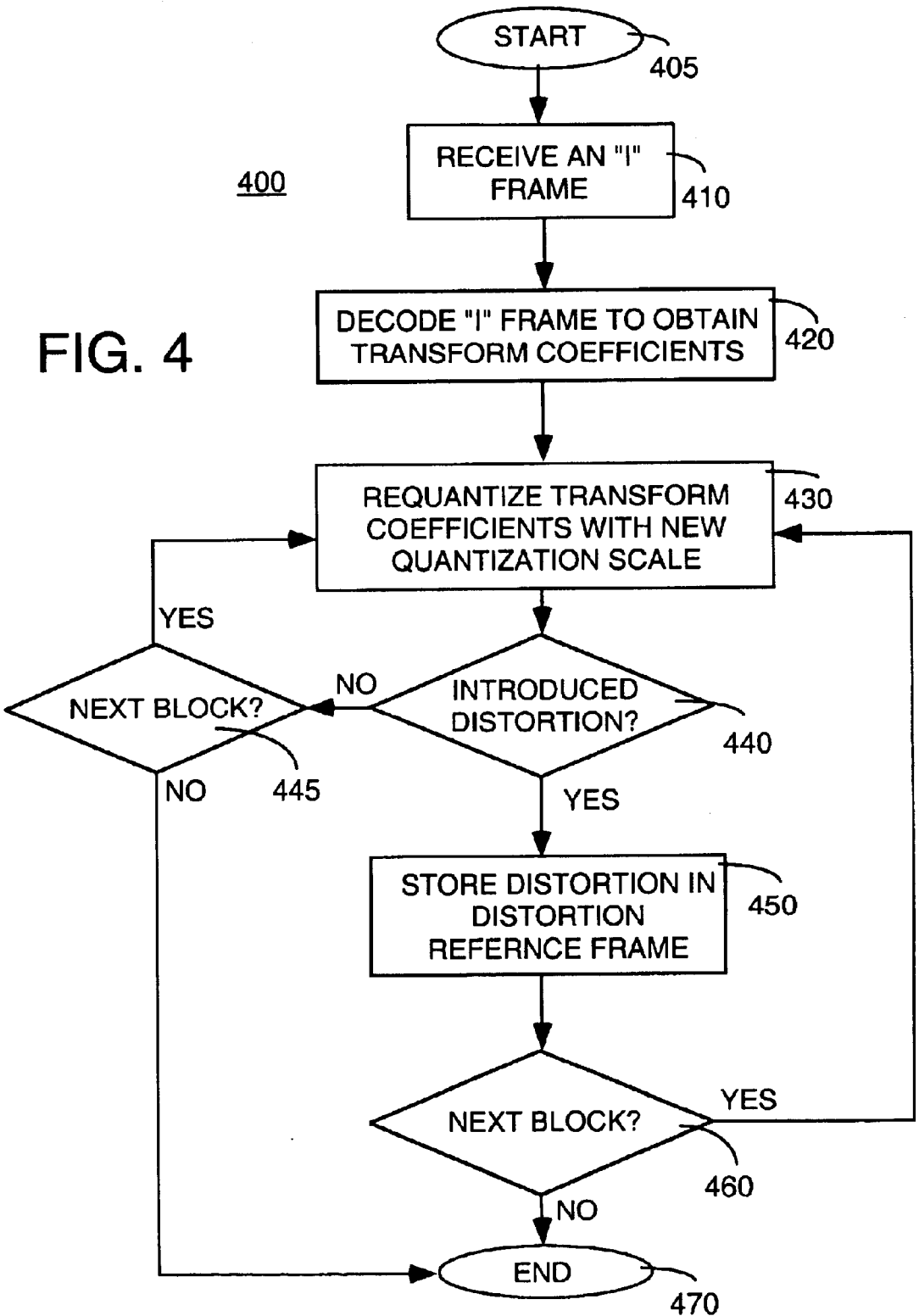
FIG. 4 illustrates a flowchart of a method for changing the bitrate of an "I" reference frame.

FIG. 4 illustrates a flowchart of a method 400 for changing the bitrate of an "I" reference frame. Method 400 starts in step 405 and proceeds to step 410, where an I frame is received for changing its bitrate.

In step 420, the I frame is partially decoded, if necessary, to obtain transform coefficients for the I frame. For example, if the transform coefficients in the encoded bitstream is already quantized, then dequantization is applied to obtain the transform coefficients of the I frame.

In step 430, a block of transform coefficients is requantized using a new quantization scale. The quantizer scale can be selected to decrease or increase the bitrate of the encoded bitstream.

In step 440, method 400 queries whether requantization error is introduced for the current block when a new quantizer scale was selected. If the query is negatively answered, then method 400 proceeds to step 445, where method 400 queries whether there is a next block in the I frame. If the query in step 445 is negatively answered, then method 400 ends in step 470. If the query is affirmatively answered, then method 400 returns to step 430 and requantizes the next block.

Returning to step 440, if the query is affirmatively answered, then method 400 proceeds to step 450, where the requantization distortion or error is stored in a distortion reference frame.

In step 460, method 400 queries whether there is a next block in the I frame. If the query is negatively answered, then method 400 ends in step 470. If the query is affirmatively answered, then method 400 returns to step 430 and requantizes the next block until the entire I frame is requantized.

Figure 5:
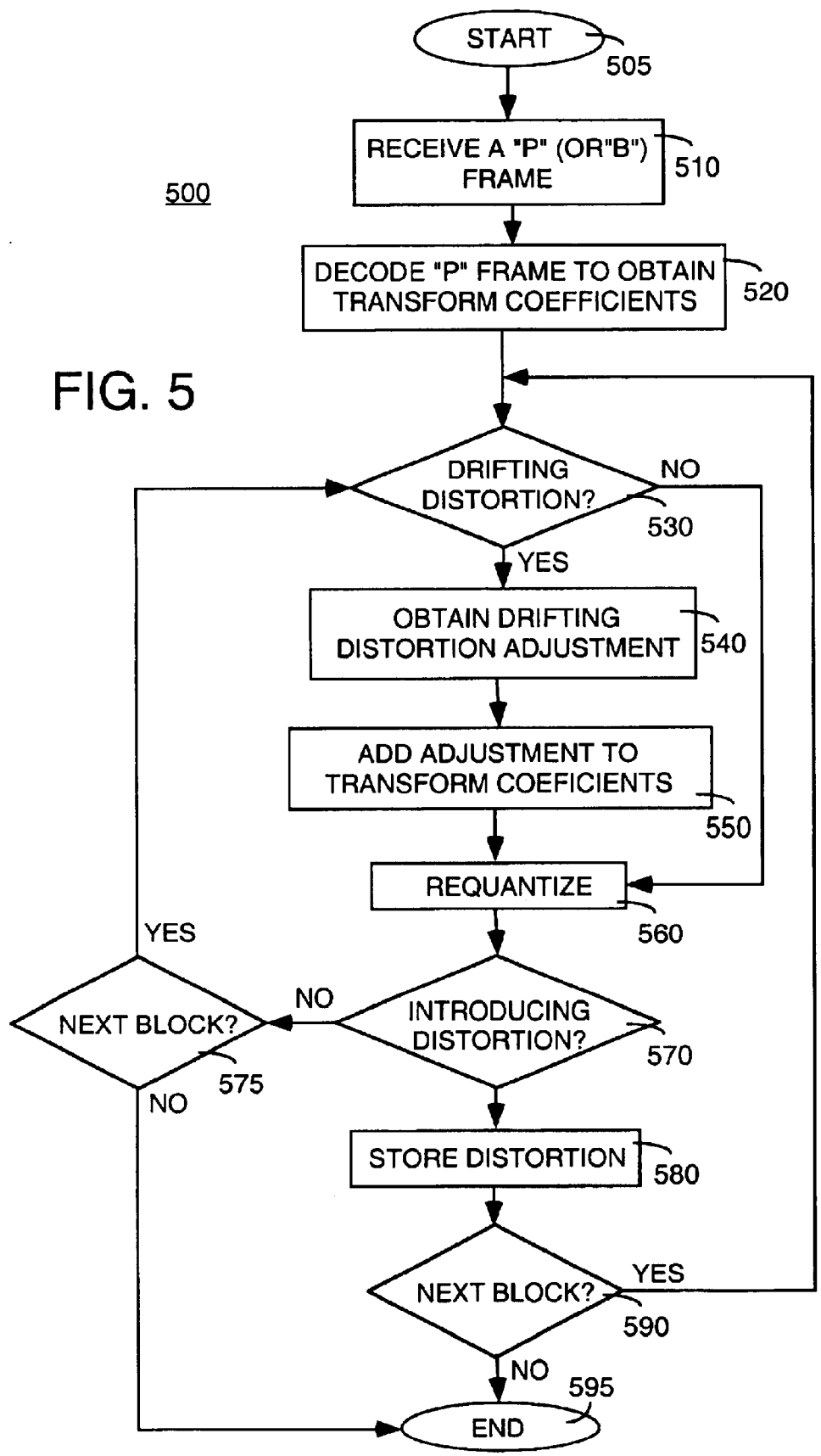
FIG. 5 illustrates a flowchart of a method for changing the bitrate of a "P" reference frame.

FIG. 5 illustrates a flowchart of a method 500 for changing the bitrate of a "P" reference frame (or "B" as noted below). Method 500 starts in step 505 and proceeds to step 510, where a P frame is received for changing its bitrate.

In step 520, the P frame is partially decoded, if necessary, to obtain transform coefficients for the P frame. For example, if the transform coefficients in the encoded bitstream are already quantized, then dequantization is applied to obtain the transform coefficients of the P frame.

In step 530, method 500 queries whether requantization error or drifting distortion is introduced into a reference frame that corresponds to the current block in the P frame. Namely, method 500 evaluates the distortion reference frame to determine if the motion vectors of the current block in the P frame is pointing to a reference frame block that has introduced requantization error. If the query is negatively answered, then method 500 proceeds to step 560. If the query is affirmatively answered, then method 500 proceeds to step 540 where distortion adjustment is obtained for the present block in the P frame.

In step 550, the distortion adjustment is added to the transform coefficients obtained in step 520 and method proceeds to step 560.

In step 560, a block of transform coefficients is requantized using a new quantization scale. The quantizer scale can be selected to decrease or increase the bitrate of the encoded bitstream.

In step 570, method 500 queries whether requantization error is introduced for the current block when a new quantizer scale was selected. If the query is negatively answered, then method 500 proceeds to step 575, where method 500 queries whether there is a next block in the P frame. If the query in step 575 is negatively answered, then method 500 ends in step 595. If the query is affirmatively answered, then method 500 returns to step 530, where method 500 again queries whether quantization distortion was previously introduced.

Returning to step 570, if the query is affirmatively answered, then method 500 proceeds to step 580, where the requantization distortion or error is stored in a distortion reference frame.

In step 590, method 500 queries whether there is a next block in the P frame. If the query is negatively answered, then method 500 ends in step 595. If the query is affirmatively answered, then method 500 returns to step 530, where method 500 again queries whether quantization distortion was previously introduced.

Although FIG. 5 illustrates a method for changing the bitrate of a "P" reference frame, it should be noted that FIG. 5 also illustrates a method for changing the bitrate of a "B" reference frame with some exceptions. Namely, since B frames are not reference frames and do not accumulate error, step 580 is omitted.

Furthermore, although the present invention is described in terms of reducing the bitrate of an encoded bitstream, it should be understood that the present invention can be implemented to increase the bitrate of an encoded bitstream. For example, there are situations where it is desirable to change the GOP structure, e.g., to increase the number of I frames in the GOP in response to channel conditions, e.g., a noisy communication channel. Namely, a P frame can be decoded completely in the pixel domain, then re-encoded as an I frame and the distortion propagated to following frames. Similarly, an I frame can be converted to a P frame, by computing (or extrapolating) motion vectors.

Changing bitrate in general means changing the quantization level or scale. Choosing an appropriate quantization level when re-encoding is a different problem from that of initial quantization. In particular, it has been observed that small changes in quant-scale are not very productive in effecting significant bitrate changes, as they will increase distortion and will not significantly reduce the bitrate.

An efficient re-quantization level is "n" times original Quant-level but n+0.5 may also be appropriate in some cases. Although such requantization levels will be effective in changing bitrates, it may be too coarse of an adjustment for certain applications.

Thus, the present bitrate changing method can also be implemented using various quantization selection or rate control methods. First, a method for finely controlling the output bitrate is to download a new Q-matrix, where some of the coefficients are N-times and other are M-times the original coefficients. For example, Q-steps could be twice up to a certain DCT coefficient (e.g., coefficients 1 through 24), and three times from the remaining coefficients (e.g., coefficients 25 through 64). By varying the coefficients where the multiplying factor are changed, this provides a much finer control over the bitrate.

In summary, quantization scale selection can be quantified as follows:

1. Multiply all quantization steps by a fixed factor (e.g., 2, 3, and so on);
2. Multiply some coefficients by a factor (e.g., 1), and others by a different factor (e.g., 2). This option can be further subdivided into:
   2.1. A new quantization matrix is downloaded. This allows any values to be used for the two scaling factors.
   2.2. The second factor is set sufficiently high such that all subsequent coefficients are quantized to zeros. This is equivalent to truncating the DCT coefficients at a certain coefficient, i.e., based on spatial frequency location of the transform coefficients. In this case, no quantization matrix has to be downloaded.
   2.3. The second factor applies only to coefficients whose value is below a certain threshold. If the second factor is again made large enough to turn all these coefficients into zeros, then no quantization matrix needs to be downloaded.

The main advantage of the quantization scale selection of paragraph 1 is its simplicity, and the fact that it does not require downloading a new quantization matrix. Whereas, the main advantages of the various quantization scale selection methods as described in paragraph 2 include finer control over the bitrate, and the ability to fine tune the bitrate change. This is because it is possible to pre-compute how many bits would be saved by increasing the quantization of each DCT coefficient. This would be done on a macroblock (MB) by MB level. For example, if deciding at which coefficient to change between a scaling factor of 1 and 2, one can follow the following process:

```
Savings[64] = – bits to send quantization table;
for each macroblock:
   for each DCT coefficient i , starting from the last:
      Savings[i] = Savings[i+1];
      if coefficient[i] == 1
         Savings[i] + = bits originally used for this coefficient;
         Savings[i] – = bits used for next coefficient;
         Savings[i] + = bits used for next coefficient with the new
run number.
      else if coefficient[i] > 1
         Savings[i] + = bits originally used for this coefficient;
         Savings[i] – = bits necessary to encode new (/2)
coefficient.
      endif
   endfor
endfor.
```

Figure 6:
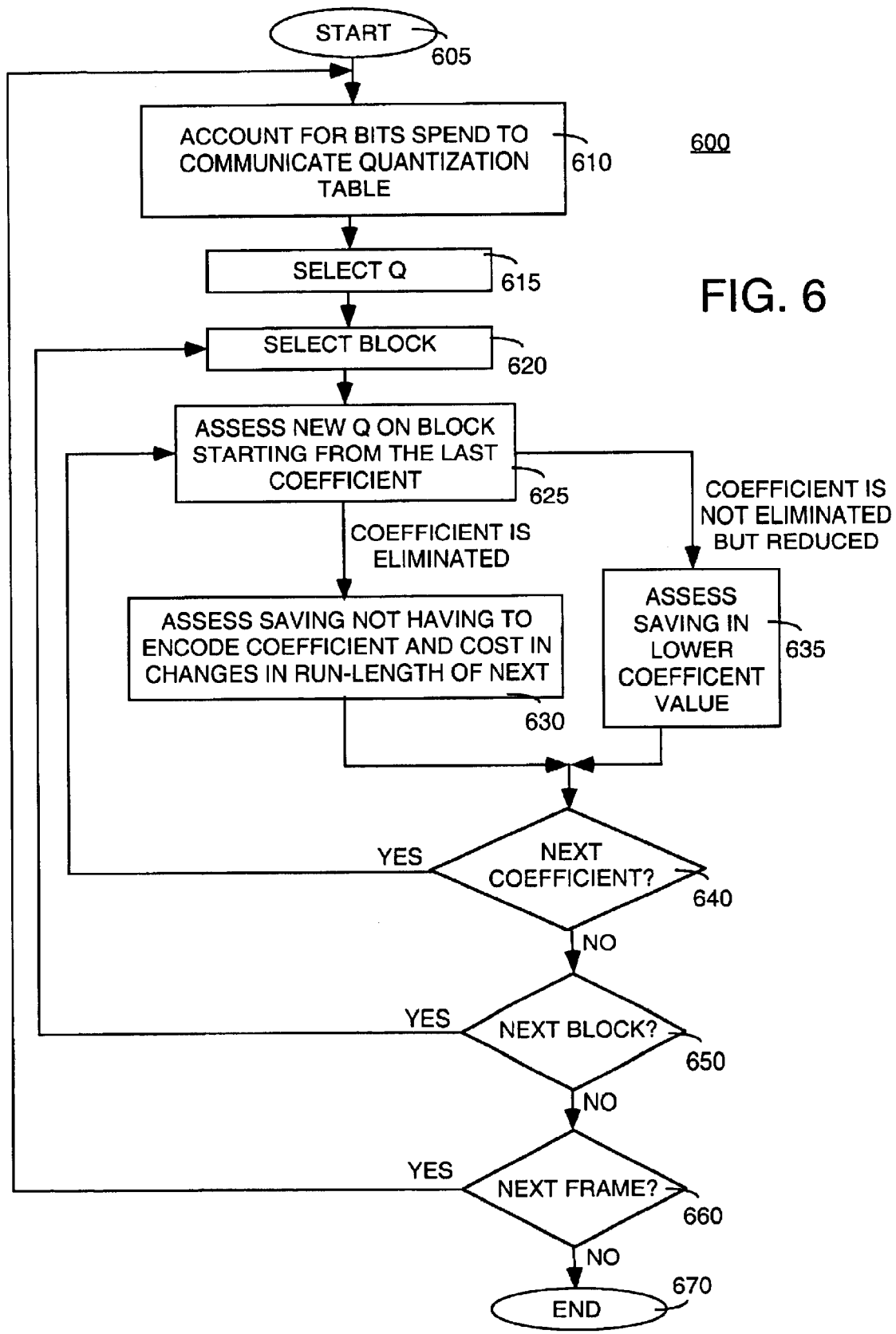
FIG. 6 illustrates a flowchart of a method for assessing the amount of saving in bits due to selecting a different quantizer scale.

This process is summarized in FIG. 6, which illustrates a flowchart of a method 600 for assessing the amount of saving in bits due to selecting a different quantizer scale. Method 600 starts in step 605 and proceeds to step 610, where an accounting is taken to assess the number of bits that have to be spend to communicate a new quantization table or matrix into the encoded bitstream.

In step 615, a quantizer scale Q is selected and in step 620 a block is selected. In step 625, the new or selected quantizer scale is evaluated starting from the last coefficient of the selected block, e.g., the 64th transform coefficient in an 8×8 block. If the new quantizer is such that the coefficient is eliminated, then method 600 proceeds to step 630, where the saving in bits is determined for not having to encode the "x"th transform coefficient, but the increased cost in bits is also determined for changing the run-length information. If the new quantizer is such that the coefficient is not eliminated, but only reduced, then method 600 proceeds to step 635, where the saving in bits is determined having to encode a smaller "x"th transform coefficient.

In step 640, method 600 queries whether there is a next coefficient in the selected block. If the query is negatively answered, then method 600 proceeds to step 650. If the query is affirmatively answered, then method 600 returns to step 625.

In step 650, method 600 queries whether there is a next block in the current frame. If the query is negatively answered, then method 600 proceeds to step 660. If the query is affirmatively answered, then method 600 returns to step 620.

In step 660, method 600 queries whether there is a next frame in the image sequence or group of pictures (GOP). If the query is negatively answered, then method 600 ends in step 670. If the query is affirmatively answered, then method 600 returns to step 610.

It should be noted that at the end of steps 650 or 660, it would be possible to assess the exact information on how many bits would be saved by selecting a certain coefficient as the threshold between the two quantization levels or certain block as the threshold within a frame. By using this information, a reasonably precise bitrate control method can be implemented.

Figure 7:
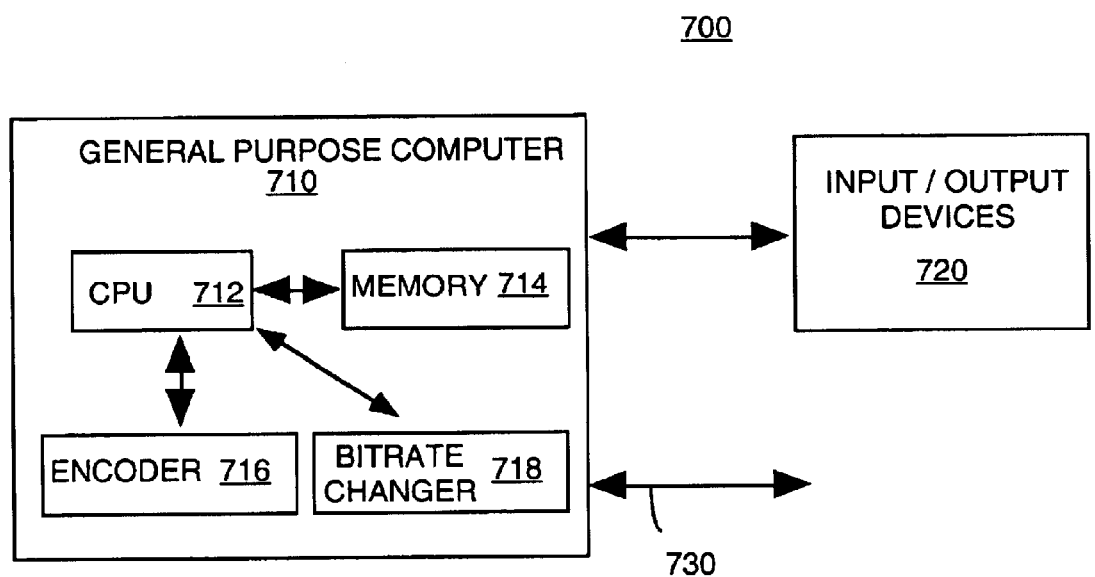
FIG. 7 illustrates a block diagram of an encoding system of the present invention.

FIG. 7 illustrates an encoding system 700 of the present invention. The encoding system comprises a general purpose computer 710 and various input/output devices 720. The general purpose computer comprises a central processing unit (CPU) 712, a memory 714, an encoder 716 and a bitrate changer 718 for receiving and encoding a sequence of images.

In the preferred embodiment, the encoder 716 is simply the encoder 200 and the bitrate changer 718 is simply the bitrate changer 118 as discussed above. In fact, the entire server 110 can be implemented using the general purpose computer 710. The encoder 716 and the bitrate changer 718 can be physical devices which are coupled to the CPU 712 through a communication channel. Alternatively, the encoder 716 and bitrate changer 718 can be represented by a software application (or a combination of software and hardware, e.g., application specific integrated circuits (ASIC)) which is loaded from a storage device and resides in the memory 712 of the computer. As such, the encoder 200 and the bitrate changer of the present invention can be stored on a computer readable medium, e.g., a memory or storage device. In turn, the motion information, i.e., motion files and the encoded image sequence at various frame rates, which are generated by the encoder 716, can also be stored on a computer readable medium, e.g., RAM memory, magnetic or optical drive or diskette and the like.

The computer 710 can be coupled to a plurality of input and output devices 720, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device.

Although various embodiments which incorporate the teachings of the present invention have been shown and described in detail herein, those skilled in the art can readily devise many other varied embodiments that still incorporate these teachings.

What is claimed is:

1. A method for changing a first bitrate of an encoded image sequence having a plurality of frames, said method comprising the steps of:
  a) requantizing a block of transform coefficients within a current frame of said encoded image sequence using a new quantizer scale to generate a block of requantized transform coefficients;
  b) encoding said block of requantized transform coefficients into an encoded image sequence having a second bitrate; and
  c) storing a requantization error associated with said requantization of said block of transform coefficients for propagating said requantization error, if said current frame is used as a reference frame.

2. The method of claim 1, wherein said storing step (c) stores said requantization error onto a distortion reference frame.

3. The method of claim 2, wherein said storing step (c) stores said requantization error onto a distortion reference frame in a pixel domain.

4. The method of claim 1, wherein said requantizing step (a) requantizes a block of transform coefficients within a current I frame.

5. The method of claim 1, wherein said requantizing step (a) requantizes a block of transform coefficients within a current P frame.

6. The method of claim 1, further comprising the step of:
  (a') determining whether a distortion adjustment should be added to said block of transform coefficients within a current frame, prior to said requantizing step (a).

7. The method of claim 6, wherein said distortion adjustment is calculated as an adjustment to said transform coefficients in a transform domain.

8. An apparatus for changing a first bitrate of an encoded image sequence having a plurality of frames, said apparatus comprising:
  a quantizer for requantizing a block of transform coefficients within a current frame of said encoded image sequence using a new quantizer scale to generate a block of requantized transform coefficients;
  a coder, coupled to said quantizer, for encoding said block of requantized transform coefficients into an encoded image sequence having a second bitrate; and
  a storage device, coupled to said quantizer, for storing a requantization error associated with said requantization of said block of transform coefficients for propagating said requantization error, if said current frame is used as a reference frame.

9. The apparatus of claim 8, wherein said requantization error is stored as a distortion reference frame.

10. The apparatus of claim 9, wherein said distortion reference frame is in a pixel domain.

11. The apparatus of claim 8, wherein said current frame is an I frame.

12. The apparatus of claim 8, wherein said current frame is a P frame.

13. The apparatus of claim 8, further comprising:
  a summer, coupled to said quantizer, for adding a distortion adjustment to said block of transform coefficients within a current frame.

14. The apparatus of claim 13, wherein said distortion adjustment is calculated as an adjustment to said transform coefficients in a transform domain.

15. A computer-readable medium having stored thereon a plurality of instructions, the plurality of instructions including instructions which, when executed by a processor, cause the processor to perform the steps comprising of:
- a) requantizing a block of transform coefficients within a current frame of said encoded image sequence using a new quantizer scale to generate a block of requantized transform coefficients;
- b) encoding said block of requantized transform coefficients into an encoded image sequence having a second bitrate; and
- c) storing a requantization error associated with said requantization of said block of transform coefficients for propagating said requantization error, if said current frame is used as a reference frame.

16. The computer-readable medium of claim 15, wherein said storing step (c) stores said requantization error onto a distortion reference frame.

17. The computer-readable medium of claim 16, wherein said storing step (c) stores said requantization error onto a distortion reference frame in a pixel domain.

18. The computer-readable medium of claim 15, wherein said requantizing step (a) requantizes a block of transform coefficients within a current I frame.

19. The computer-readable medium of claim 15, wherein said requantizing step (a) requantizes a block of transform coefficients within a current P frame.

20. The computer-readable medium of claim 15, further comprising the step of:
- (a') determining whether a distortion adjustment should be added to said block of transform coefficients within a current frame, prior to said requantizing step (a).

21. The computer-readable medium of claim 20, wherein said distortion adjustment is calculated as an adjustment to said transform coefficients in a transform domain.

* * * * *